United States Patent
Kim (10) Patent No.: US 9,796,169 B2
(45) Date of Patent: Oct. 24, 2017

(54) DISPLAY PANEL MANUFACTURING APPARATUS

(71) Applicant: SAMSUNG DISPLAY CO., LTD., Yongin-si, Gyeonggi-Do (KR)

(72) Inventor: Hyun Chuel Kim, Cheonan-si (KR)

(73) Assignee: Samsung Display Co., Ltd., Yongin-Si, Gyeonggi-do (KR)

( * ) Notice: Subject to any disclaimer, the term of this patent is extended or adjusted under 35 U.S.C. 154(b) by 0 days.

(21) Appl. No.: 14/873,707

(22) Filed: Oct. 2, 2015

(65) Prior Publication Data
US 2016/0236458 A1 Aug. 18, 2016

(30) Foreign Application Priority Data

Feb. 13, 2015 (KR) ........................ 10-2015-0022408

(51) Int. Cl.
*B32B 37/00* (2006.01)
*B32B 38/18* (2006.01)
*B32B 37/12* (2006.01)

(52) U.S. Cl.
CPC ...... *B32B 38/1866* (2013.01); *B32B 37/0046* (2013.01); *B32B 37/1292* (2013.01); *B32B 38/1825* (2013.01); *B32B 2307/422* (2013.01); *B32B 2457/20* (2013.01)

(58) Field of Classification Search
CPC .......... B32B 2307/422; B32B 2457/20; B32B 37/0046; B32B 37/1292; B32B 38/1825; B32B 38/1866; B32B 41/00; B32B 2041/06; B29C 66/924

USPC ....... 156/358, 359, 360, 365, 366, 367, 368, 156/580, 581

See application file for complete search history.

(56) References Cited

U.S. PATENT DOCUMENTS

| | | | |
|---|---|---|---|
| 2003/0173035 A1* | 9/2003 | Yamaguchi | H01L 21/67092 156/580 |
| 2009/0277578 A1* | 11/2009 | Sung | B32B 37/003 156/285 |
| 2014/0002975 A1* | 1/2014 | Lee | H05K 5/0017 361/679.01 |

FOREIGN PATENT DOCUMENTS

| | | |
|---|---|---|
| KR | 10-2014-0002491 A | 1/2014 |
| KR | 10-2014-0010919 A | 1/2014 |
| KR | 10-2014-0044579 A | 4/2014 |
| KR | 10-2014-0052714 A | 5/2014 |

* cited by examiner

*Primary Examiner* — George Koch
(74) *Attorney, Agent, or Firm* — Lee & Morse, P.C.

(57) ABSTRACT

A display panel manufacturing apparatus includes a first jig having a portion that is bent and a lower surface to which a window member is coupleable, a second jig having one surface that is coupleable to the lower surface of the first jig, the second jig being spaced apart from the first jig and having an upper surface on which a sheet member is attachable, a grip unit that is spaced apart from the second jig, the grip unit including a seating groove in which an end portion of the sheet member is seatable, and a movement limiting member moveably mounted on a top of the grip unit and configured to support the end portion of the sheet member in a state that the sheet member is separated from the grip unit, such that a movement of the sheet member is limited for a preset time.

14 Claims, 6 Drawing Sheets

DISPLAY PANEL MANUFACTURING APPARATUS

CROSS-REFERENCE TO RELATED APPLICATION

Korean Patent Application No. 10-2015-0022408, filed on Feb. 13, 2015, in the Korean Intellectual Property Office, and entitled: "Display Panel Manufacturing Apparatus," is incorporated by reference herein in its entirety.

BACKGROUND

1. Field

Embodiments relate to a display panel manufacturing apparatus.

2. Description of the Related Art

Recently, a flexible display device including a flexible substrate that is light, has strong resistant against an impact, and is made of a plastic material has been developed. A flexible display device may be folded or rolled up in a roll form. The flexible display device may maximize portability and may be utilized in various fields.

The flexible display device may include display elements formed on the flexible substrate. Examples of display elements that may be used in the flexible display device include an organic light emitting diode display element, a liquid crystal display element, an electrophoretic display (EPD) element, or the like.

The display elements described above commonly include a thin film transistor. In order to form the flexible display device, the flexible substrate may undergo several thin film processes.

The flexible substrate which goes through the thin film process may be sealed by an encapsulation substrate. The flexible substrate, the thin film transistor formed on the flexible substrate, and the encapsulation substrate as described above form a display panel of the flexible display device.

SUMMARY

Embodiments are directed to a display panel manufacturing apparatus including a first jig having a portion that is bent and a lower surface to which a window member is coupleable, a second jig having one surface that is coupleable to the lower surface of the first jig, the second jig being spaced apart from the first jig and having an upper surface on which a sheet member is attachable, a grip unit that is spaced apart from the second jig, the grip unit including a seating groove in which an end portion of the sheet member is seatable, and a movement limiting member moveably mounted on a top of the grip unit and configured to support the end portion of the sheet member in a state that the sheet member is separated from the grip unit, such that a movement of the sheet member is limited for a preset time.

The display panel manufacturing apparatus may further include a first driving part that moves the grip unit in one direction, and a controlling part that controls the first driving part and moves the grip unit as much as a preset distance such that the sheet member, in the state that the sheet member is separated from the grip unit, spans the movement limiting member.

The display panel manufacturing apparatus may further include a second driving part that is drivable such that the movement limiting member is moved or rotated with respect to the grip unit.

The second driving part may be drivable such that the movement limiting member is moved along a top surface of the grip unit.

The second driving part may be drivable such that the movement limiting member is protrudingly moved toward the top surface of the grip unit from a state in which the movement limiting member is disposed in the grip unit, or the movement limiting member is moved into an internal portion of the grip unit from a state in which the movement limiting member protrudes from the top surface of the grip unit.

The movement limiting member may be rotatably coupled to the grip unit.

The movement limiting member may have a polygonal shape.

The movement limiting member may be a plate spring.

The movement limiting member may be integrally formed with the grip unit.

The window member may have a curved surface having a preset radius of curvature.

An adhesive layer may be on a surface of the sheet member that is contactable with the window member.

The sheet member may include a display panel.

The sheet member may be flexible.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In the drawing figures, the dimensions of layers and regions may be exaggerated for clarity of illustration. Like reference numerals refer to like elements throughout.

Figure 1:
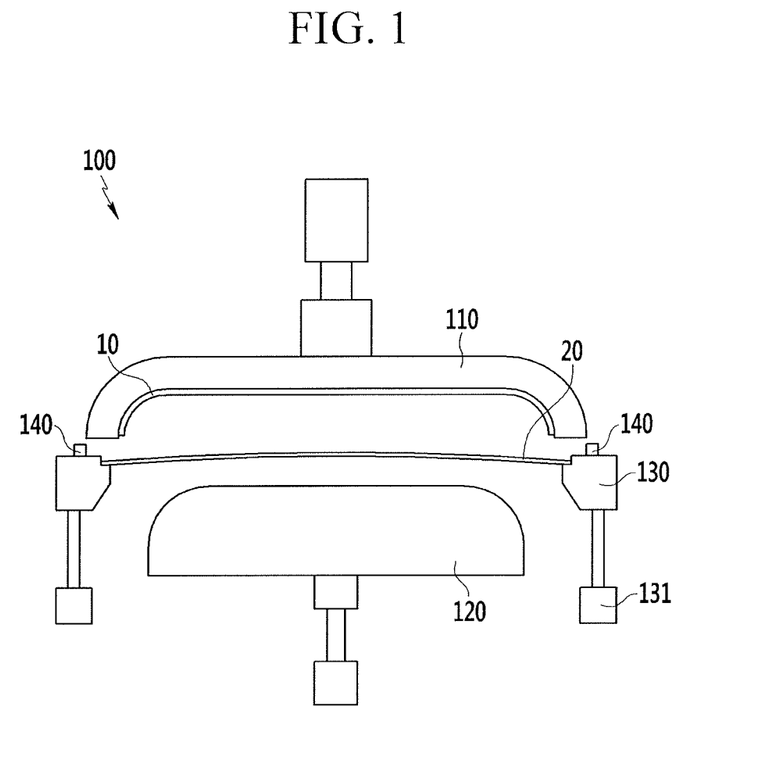
FIG. 1 illustrates a drawing depicting a display panel manufacturing apparatus according to an exemplary embodiment.

FIG. 1 illustrates a perspective view depicting a display panel manufacturing apparatus according to an exemplary embodiment. Referring to FIG. 1, a display panel manufacturing apparatus 100 according to an exemplary embodiment may include a first jig 110, a second jig 120, a grip unit 130, and a movement limiting member 140.

The first jig 110 may have a portion formed to be bent. The first jig 110 may have a lower surface to which a window member 10 is coupled. The window member 10 may have a curved surface having a preset radius of curvature.

The first jig 110 may have a shape similar to that of the window member 10. For example, a surface of the first jig 110 to which the window member 10 is coupled may be formed as a curved surface.

The second jig 120 may be formed such that one surface thereof may be coupled to the lower surface of the first jig 110. The second jig 120 may be spaced apart from the first jig 110. The second jig 120 may have an upper surface on which a sheet member 20 is disposed.

The sheet member 20 may include a display panel and may selectively further include a touch screen panel (TSP). The sheet member 20 may have flexible characteristics.

An adhesive layer may be formed on a surface of the sheet member 20 that is to contact the window member 10. The adhesive layer may include an optically clear adhesive (OCA) film or an adhesive material.

The adhesive layer may have a size that is equal to or less than that of the sheet member 20. The sheet member 20 may be rigidly attachable to the window member 10 by the adhesive layer.

The material of the first jig 110 and the second jig 120 may be variously selected. For example, at least one of the first jig 110 and the second jig 120 may be formed of an elastic material. In some implementations, at least one of the first jig 110 and the second jig 120 may be formed of a hard material. For example, the elastic material may include a material that is flexible and has elastic force, such as silicon, rubber, or a flexible synthetic resin. The hard material may be a material having high hardness, such as reinforced plastic or metal.

For example, the first jig 110 may be formed of metal and the second jig 120 may be formed of silicon. In some implementations, the first jig may be formed of rubber and the second jig 120 may be formed of plastic. Hereinafter, a detailed description will be provided based on a case in which both the first jig 110 and the second jig 120 are formed of the hard material, for convenience of explanation.

The display panel manufacturing apparatus 100 according to an exemplary embodiment may include a powering part connected to at least one of the first jig 110 and the second jig 120 so as to move at least one of the first jig 110 and the second jig 120.

The display panel manufacturing apparatus 100 according to an exemplary embodiment may include a fixing part preventing the window member 10 seated on the first jig 110 from being separated or preventing the sheet member 20 seated on the second jig 120 from being moved. The fixing part may be variously formed. For example, the fixing part may include an inhalation part formed in at least one of the first jig 110 and the second jig 120. The fixing part may include an inhalation pump that inhales air.

In some implementations, the fixing part may be a separate frame formed in the first jig 110 or the second jig 120. In some implementations, the fixing part may be an adhesive member having adhesion.

The grip unit 130 may be disposed to be spaced apart from the second jig 120. The grip unit 130 may grip the sheet member 20. One end of the sheet member 20 may be inserted into the grip unit 130, such that the grip unit 130 may support the sheet member 20. To this end, an insertion groove may be formed in one side of the grip unit 130.

A plurality of grip units 130 may be provided. A distance between the plurality of grip units 130 may be equal to or less than a width or length of the sheet member 20. The grip units 130 may be disposed so as to each face sides of the second jig 120.

The grip unit 130 may be moved together with the second jig 120. In other implementations, the grip unit 130 may be independently moved regardless of the movement of the second jig 120.

The movement limiting member 140 may be movably mounted on a top of the grip unit 130. The movement limiting member 140 may support an end portion of the sheet member 20 that has been separated from the grip unit 130.

Figure 2:
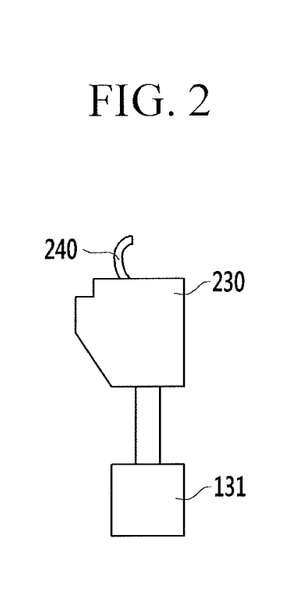
FIGS. 2 and 3 illustrate diagrams depicting modified examples of a movement limiting member included in the display panel manufacturing apparatus according to an exemplary embodiment.

In some implementations, the grip unit 130 and the movement limiting member 140 may be the grip unit 230 and movement limiting member 240 as illustrated in FIG. 2, where the movement limiting member 240 is a plate spring, by way of example.

Figure 3:
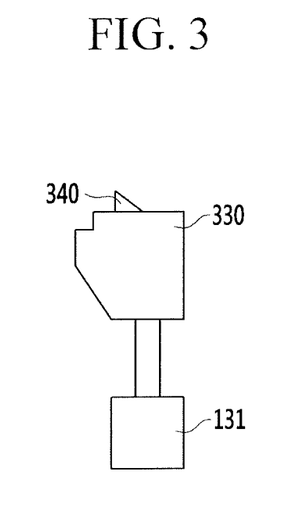

In some implementations, the grip unit 130 and the movement limiting member 140 may be the grip unit 330 and movement limiting member 340 as illustrated in FIG. 3, where the movement limiting member 340 has a shape of a polygon. For example, the shape of the movement limiting member 340 may be any one selected from a triangle, a rectangle, and a square.

The movement limiting member 140 may limit the movement of the sheet member 20 for a preset time. A detailed description thereof will be provided with regard to a process in which the window 10 and the sheet member 20 are attached to each other, as will be described below.

The display panel manufacturing apparatus 100 according to an exemplary embodiment may include a first driving part 131 and a controlling part.

The first driving part 131 may move the grip unit 130 in one direction. The first driving part 131 may allow the grip unit 130 to be moved in a horizontal direction or a vertical direction. To this end, the first driving part 131 may be a suitable apparatus to move the grip unit 130. For example, the first driving part 131 may be a powering apparatus such as a hydraulic apparatus, pneumatic apparatus, rack gear, a pinion gear, a roller, a belt, a linear motor, or the like.

The controlling part controls the first driving part 131. The controlling part may move the grip unit 130 as much as a preset distance such that the sheet member 20 is separated from the grip unit 130 and spans the movement limiting member 140.

The controlling part may be a suitable controlling apparatus that controls the display panel manufacturing apparatus according to an exemplary embodiment, by way of example. In some implementations, the controlling part may be a microprocessor that is operated independently from the controlling apparatus.

By the first driving part 131 and the controlling part as described above, the sheet member 20 may be prevented from directly attaching to the window member 10 during a preset time, but may be supported by the movement limiting member 140 for the preset time.

The display panel manufacturing apparatus 100 according to an exemplary embodiment may include a second driving part. The second driving part may be driven such that the movement limiting member 140 is moved or rotated with respect to the grip unit 130.

Figure 4:
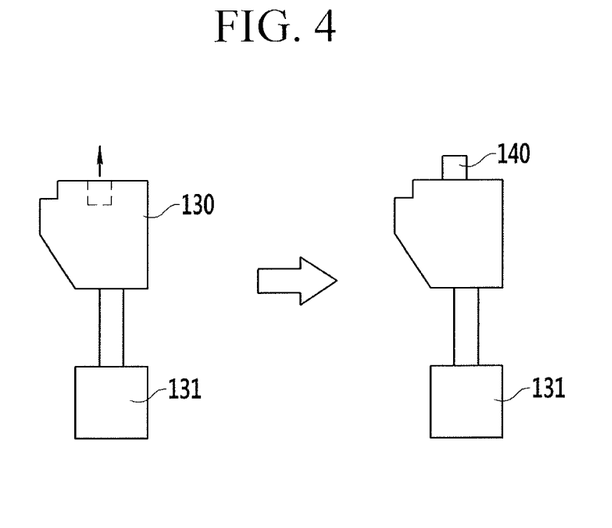
FIG. 4 illustrates a drawing depicting a process in which the movement limiting member is vertically moved by a second driving part in the display panel manufacturing apparatus according to an exemplary embodiment.

For example, as illustrated in FIG. 4, the second driving part may be driven such that the movement limiting member 140 is protrudedly moved toward a top surface of the grip unit 130 in a state in which the movement limiting member 140 is disposed inside the grip unit 130. In addition, the second driving part may be driven such that the movement limiting member 140 is moved into an internal portion of the grip unit 130 in a state in which the movement limiting member 140 protrudes from the top surface of the grip unit 130.

Figure 5:
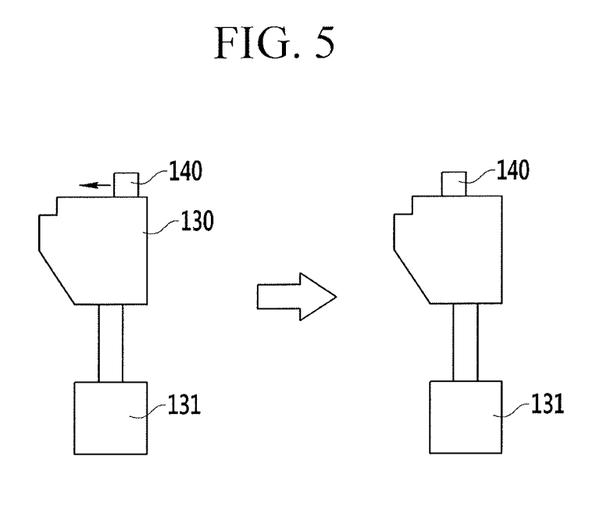
FIG. 5 illustrates a drawing illustrating a process in which the movement limiting member is horizontally moved by the second driving part in the display panel manufacturing apparatus according to an exemplary embodiment.

In some implementations, as illustrated in FIG. 5, the second driving part may allow the movement limiting member 140 to be moved along the top surface of the grip unit 130.

A structure of the second driving part may be a suitable structure that is capable of moving the movement limiting member, such as a movement structure including a rail, a movement structure using pneumatic pressure or hydraulic pressure, a movement structure including a roller or a belt, or the like.

Figure 6:
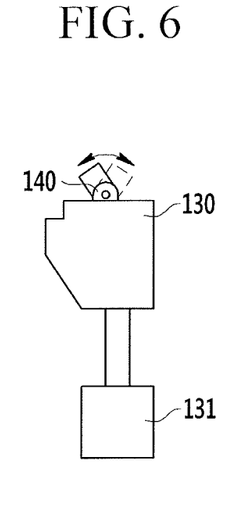
FIG. 6 illustrates a drawing illustrating a process in which the movement limiting member is rotated with respect a grip unit in the display panel manufacturing apparatus according to an exemplary embodiment.

Referring to FIG. 6, the movement limiting member 140 may be rotatably coupled to the grip unit 130, as an example. In this case, the movement limiting member 140 may be hinge-coupled to the top of the grip unit 130. The structure of the second driving part may include a roller and a motor, by way of example.

The roller may be closely attached to a bottom of the movement limiting member 140, and the roller may be rotated by the motor. To this end, a portion of the movement limiting member 140 to which the roller is closely attached may be formed in a circular shape which may be closely attached to the roller.

Figure 7:
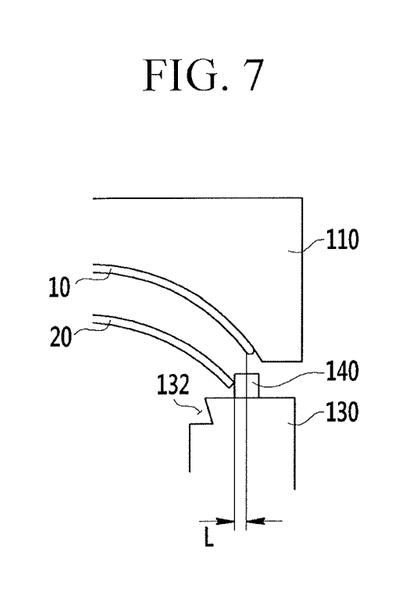
FIG. 7 illustrates an enlarged view of a portion of the display panel manufacturing apparatus according to an exemplary embodiment.

FIG. 7 illustrates an enlarged view of a portion of the display panel manufacturing apparatus according to an exemplary embodiment. Referring to FIG. 7, in the display panel manufacturing apparatus 100 (see FIG. 1) according to an exemplary embodiment, in a state in which the sheet member 20 is supported by the movement limiting member 140, an end of the sheet member 20 may be disposed to be as close as possible to an end of the window member 10 without the window member 10 and the sheet member 20 contacting each other. For example, an end of the sheet member 20 may be within about 2 mm from an end of the window member 10. If the sheet member 20 and the window member 10 are disposed to be as close as possible, it may be possible to prevent an occurrence of an attraction in a process in which the sheet member 20 and the window member 10 are bonded to each other.

Hereinafter, a process in which the window member 10 and the sheet member 20 are bonded to each other by the display panel manufacturing apparatus 100 (see FIG. 1) according to an exemplary embodiment having the structure as described above will be described.

Figure 8:
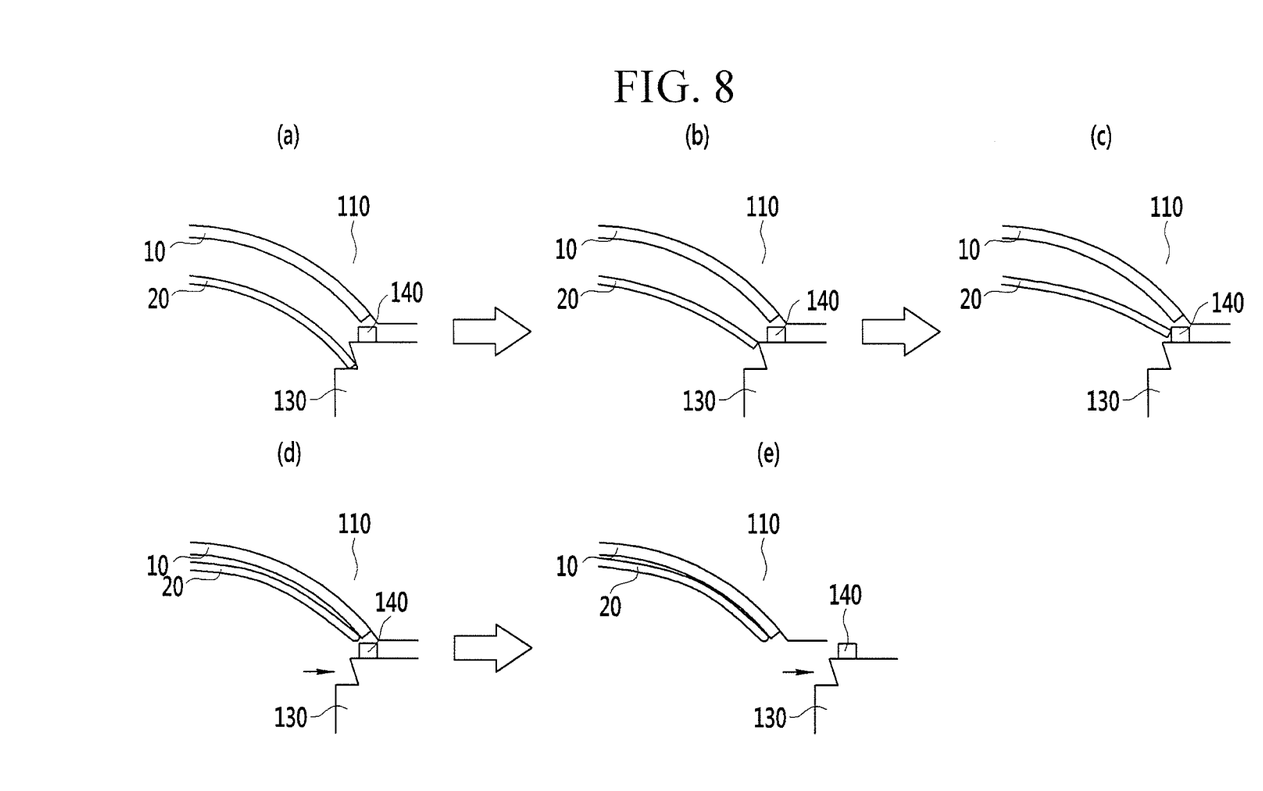
FIG. 8 illustrates an enlarged view of a portion of the display panel manufacturing apparatus sequentially depicting stages (a) through (e) of a process in which a window member and a sheet member are bonded to each other by the display panel manufacturing apparatus.

FIG. 8 illustrates a drawing sequentially showing stages (a) through (e) of a process in which a window member and a sheet member are bonded to each other by the display panel manufacturing apparatus according to an exemplary embodiment. As illustrated in FIG. 8(a), the window member 10 may be prepared and seated on a lower surface of the first jig 110. In addition, the sheet member 20 may be prepared and is seated on the second jig 120.

The first jig 110 and the second jig 120 may be operated such that, example, the first jig 110 may be moved toward the second jig 120 or the second jig 120 may be moved toward the first jig 110.

When the first jig 110 and the second jig 120 are close to each other, the second jig 120 and the grip unit 130 are also close to each other. The window member 10 and the sheet member 20 may also be disposed to be very close to each other. In this case, as shown in FIG. 8(b), immediately before the sheet member 20 and the window member 10 are completely bonded to each other, the sheet member 20 may be separated from the grip unit 130. To this end, the grip unit 130 may be distant from the second jig 120.

The movement of the grip unit 130 may be performed by the controlling part and the first driving part 131 described above. As illustrated in FIGS. 8(b) and 8(c), when the grip unit 130 is slightly moved by the controlling part, the sheet member 20 may be separated from a seating groove 132 of the grip unit 130 and may be in contact with the movement limiting member 140.

As any one of the first jig 110 and the second jig 120 is continuously moved, the grip unit 130 is also continuously moved in a direction which is distant from the second jig 120. As shown in FIGS. 8(d) and 8(e), when an end portion of the window member 10 and an end portion of the sheet member 20 are disposed to be very close to each other, the sheet member 20 is separated from the movement limiting member 140, such that the window member 10 and the sheet member 20 may be stably and closely attached to each other to be bonded to each other without the attraction caused therebetween.

If the window member and the sheet member were to be bonded to each other without using the structure described above, but instead by using a display panel manufacturing apparatus that does not include the movement limiting member, the attraction could occur between an end portion of a bottom of the window member and a top surface of the sheet member. Due to the attraction described above, the point of attraction could be visible as a spot after a display panel is finished.

However, when the window member 10 and the sheet member 20 are bonded to each other by the display panel manufacturing apparatus 100 according to an exemplary embodiment, it is possible, by the movement limiting member 140, to prevent or reduce the likelihood of an attraction being caused between the end portion of the window member 10 and the end portion of the sheet member 20. Therefore, the occurrence of the spot at the end portion of the sheet member 20 may be prevented, thereby improving quality of the display panel.

In addition, when the display panel is manufactured by the display panel manufacturing apparatus 100 according to an exemplary embodiment, the display panel may be rapidly and accurately manufactured. For example, the display panel manufacturing apparatus 100 according to an exemplary embodiment may accurately attach the window member 10 having the curved shape and the sheet member 20 to each other, thereby making it possible to minimize a defect rate.

By way of summation and review, in general, a flexible display device may be manufactured by attaching the display panel to a bottom of a window protecting the display panel. In this case, the display panel and the window may be bonded by interposing an adhesive, such as a double-sided tape, between the display panel and the window.

During a process of attaching the display panel to a bottom surface of the window, an attraction may occur between end portions of a top surface of the display panel and the bottom surface of the window. Due to the attraction, there is a problem that the attraction seems like a spot after a product is finished.

Embodiments provide a display panel manufacturing apparatus capable of improving attaching quality between a display panel and a window. According to embodiments, when the window member and the sheet member are bonded to each other by the display panel manufacturing apparatus, it is possible to prevent the attraction from being caused between the end portion of the window member and the end portion of the sheet member. Therefore, an occurrence of a spot at the end portion of the sheet member may be prevented, thereby improving the quality of the display panel.

In addition, when the display panel is manufactured by the display panel manufacturing apparatus according to an exemplary embodiment, the display panel may be rapidly and accurately manufactured. Particularly, the display panel manufacturing apparatus according to an exemplary embodiment accurately attaches the window member having a curved shape and the sheet member to each other, thereby making it possible to minimize a defect rate.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A display panel manufacturing apparatus, comprising:
   a first jig having a portion that is bent and a lower surface to which a window member is coupleable;
   a second jig having one surface that is coupleable to the lower surface of the first jig, the second jig being spaced apart from the first jig and having an upper surface on which a sheet member is attachable;
   a grip unit that is spaced apart from the second jig, the grip unit including a seating groove in which an end portion of the sheet member is seatable; and
   a movement limiting member moveably mounted on a top of the grip unit and configured to support the end portion of the sheet member in a state that the sheet member is separated from the grip unit, such that a movement of the sheet member is limited for a preset time.

2. The display panel manufacturing apparatus as claimed in claim 1, further comprising:
   a first driving part that moves the grip unit in one direction; and
   a controlling part that controls the first driving part and moves the grip unit as much as a preset distance such that the sheet member, in the state that the sheet member is separated from the grip unit, spans the movement limiting member.

3. The display panel manufacturing apparatus as claimed in claim 1, further comprising:
   a second driving part that is drivable such that the movement limiting member is moved or rotated with respect to the grip unit.

4. The display panel manufacturing apparatus as claimed in claim 3, wherein:
   the second driving part is drivable such that the movement limiting member is moved along a top surface of the grip unit.

5. The display panel manufacturing apparatus as claimed in claim 3, wherein:
   the second driving part is drivable such that
   the movement limiting member is protrudingly moved toward the top surface of the grip unit from a state in which the movement limiting member is disposed in the grip unit, or
   the movement limiting member is moved into an internal portion of the grip unit from a state in which the movement limiting member protrudes from the top surface of the grip unit.

6. The display panel manufacturing apparatus as claimed in claim 3, wherein:
   the movement limiting member is rotatably coupled to the grip unit.

7. The display panel manufacturing apparatus as claimed in claim 1, wherein:
   the movement limiting member has a polygonal shape.

8. The display panel manufacturing apparatus as claimed in claim 1, wherein:
   the movement limiting member is a plate spring.

9. The display panel manufacturing apparatus as claimed in claim 1, wherein:
   the movement limiting member is integrally formed with the grip unit.

10. The display panel manufacturing apparatus as claimed in claim 1, wherein:
    the window member has a curved surface having a preset radius of curvature.

11. The display panel manufacturing apparatus as claimed in claim 1, wherein:
    an adhesive layer is on a surface of the sheet member that is contactable with the window member.

12. The display panel manufacturing apparatus as claimed in claim 1, wherein:
    the sheet member includes a display panel.

13. The display panel manufacturing apparatus as claimed in claim 1, wherein:
    the sheet member is flexible.

14. The display panel manufacturing apparatus as claimed in claim 1, wherein:
    the seating groove is configured to seat an outermost edge of the sheet member therein, and
    the movement limiting member is configured to contact the outermost edge of the sheet member in the state that the sheet member is separated from the grip unit.

* * * * *